US005552777A

United States Patent [19]

Gokcebay et al.

[11] Patent Number: 5,552,777

[45] Date of Patent: Sep. 3, 1996

[54] MECHANICAL/ELECTRONIC LOCK AND KEY

[75] Inventors: Asil T. Gokcebay, San Francisco; Yucel K. Keskin, Santa Clara, both of Calif.

[73] Assignee: Security People, Inc., San Francisco, Calif.

[21] Appl. No.: 342,846

[22] Filed: Nov. 21, 1994

Related U.S. Application Data

[63] Continuation-in-part of Ser. No. 836,206, Feb. 14, 1992, Pat. No. 5,367,295.

[51] Int. Cl.[6] .......... G06F 7/04

[52] U.S. Cl. .......... 340/825.31; 70/278; 361/172

[58] Field of Search .......... 340/825.31, 825.3; 70/278; 361/172

[56] References Cited

U.S. PATENT DOCUMENTS

| | | | |
|---|---|---|---|
| 480,299 | 8/1892 | Voight . | |
| 550,111 | 11/1895 | Sargent . | |
| 564,029 | 7/1896 | Sargent . | |
| 3,208,248 | 2/1963 | Tornoe . | |
| 3,733,862 | 5/1973 | Killmeyer . | |
| 3,797,936 | 3/1974 | Dimitriadis . | |
| 4,144,523 | 3/1979 | Kaplit . | |
| 4,209,782 | 6/1980 | Donath et al. . | |
| 4,257,030 | 3/1981 | Bruhin et al. . | |
| 4,326,124 | 4/1982 | Faude . | |
| 4,562,712 | 1/1986 | Wolter . | |
| 4,620,088 | 10/1986 | Flies . | |
| 4,659,915 | 4/1987 | Flies . | |
| 4,663,952 | 5/1987 | Gelhard | 70/278 |
| 4,686,358 | 8/1987 | Seckinger et al. . | |
| 4,712,398 | 12/1987 | Clarkson et al. . | |
| 4,723,427 | 2/1988 | Oliver . | |
| 4,732,022 | 3/1988 | Oliver . | |
| 4,789,859 | 12/1988 | Clarkson et al. . | |
| 4,823,575 | 4/1989 | Florian et al. . | |
| 4,998,952 | 3/1991 | Hyatt, Jr. et al. . | |
| 5,140,317 | 8/1992 | Hyatt, Jr. et al. | 340/825.31 |
| 5,245,329 | 9/1993 | Gokcebay | 340/825.31 |

*Primary Examiner*—Michael Horabik
*Assistant Examiner*—Edwin C. Holloway, III
*Attorney, Agent, or Firm*—Thomas M. Freiburger

[57] ABSTRACT

A mechanical lock and key, which may have a conventional cylinder with mechanical bittings, includes an electronic access control feature for preventing opening of the lock, even with the proper mechanical key, unless prescribed conditions are met. The lock cylinder, preferably in the cylinder plug, is fitted with a small ID or "serial number" chip which is read when a voltage is applied. A connected device, also very small, is an addressable switch. The switch is connected to a solenoid capable of withdrawing a blocking pin, when the switch is activated and conveys voltage to the solenoid. The mechanical key has a key head with a battery, microprocessor and database. When the key is inserted into the lock, a one-wire bus connection conveys the lock ID to the microprocessor in the key, a comparison is made by the microprocessor to determine whether the lock is authorized to be opened, and if so, a code for the addressable switch, determined from the key database, is sent via the one wire bus to the switch, which causes the switch to conduct power to the solenoid, withdrawing the blocking pin and enabling opening of the lock. A record is made in the database as to each instance of opening of each lock which the key fits.

28 Claims, 8 Drawing Sheets

MECHANICAL/ELECTRONIC LOCK AND KEY

This application is a continuation-in-part of application Ser. No. 836,206, filed Feb. 14, 1992, now U.S. Pat. No. 5,367,295.

BACKGROUND OF THE INVENTION

This invention is in the field of security and access control, and the invention particularly concerns access to coin box locks and other situations wherein a single mechanical key fits a number of locks and wherein there is a need to control the instances of opening each lock and to maintain record thereof.

In the past, a number of electronic security features have been added to mechanical locks which use mechanical types of cylinders. In addition, locking elements controlled by electronic-means have been disclosed in combination with non-mechanical types of tumblers, such as in Clarkson et al. U.S. Pat. No. 4,712,398. Some of the existing electronic systems have employed keypads, some have employed cards, some have had purely electronic, magnetic or optical access control devices, and some have employed mechanical keys equipped with electronic circuitry.

With respect to the present invention, distinction is made among purely electronic, magnetic or optical keys; mechanical keys equipped with electronic, magnetic or optical features; and mechanical keys which operate solely by mechanical bittings, whether those bittings be pin tumbler, dimples or other mechanical patterns.

A key comprised of purely electronic circuitry, magnetic or optical data storage for determining and granting access is an electronic key. In the use of such a key, the circuitry or recorded data is transferred to a reader associated with a lock, and the reader recognizes a pattern or code held by the key. The key does not carry any mechanical cut or bitting configuration needed for granting access. Keys Of this type can be found in U.S. Pat. Nos. 3,797,936 (Dimitriadis), 4,209,782 (Donath et al.), 4,257,030 (Bruhin et al.), 4,620,088 (Flies), 4,659,915 (Flies) and 4,789,859 (Clarkson et al.).

Keys referred to as mechanical keys are those which activate a mechanical device, with a pattern of mechanical bittings, by direct contact with the interpreting device, i.e. the tumblers or other pattern-holding apparatus contained in the lock. In a typical pin tumbler lock, access is granted based on the depth and configuration of key cuts meeting the tumblers. In most cases, once proper alignment is established in the tumblers, the keyholder is able to turn the key to lock and unlock the locking device. However, in some cases of mechanical keys, a push or pull action may be necessary for locking and unlocking of the device. The tumblers mentioned above can be pin tumblers, lever tumblers, disk tumblers, rotary disk tumblers, slider tumblers, or combinations of several of these incorporated within the same lock. Examples of purely mechanical keys are found in U.S. Pat. Nos. 480,299 (Voight), 550,111 (Sargent), 564,029 (Sargent), 3,208,248 (Tornoe), 4,723,427 (Oliver), 4,732,022 (Oliver) and 4,823,575 (Florian et al.).

Examples of mechanical keys equipped with electronic circuitry, magnetic or optical data storage or optical recognizable features can be found in U.S. Pat. Nos. 3,733,862 (Killmeyer), 4,144,523 (Kaplit), 4,326,124 (Faude), 4,562,712 (Wolter), 4,663,952 (Gelhard), 4,686,358 (Seckinger et al.), 5,245,329 (Gokcebay) and 5,140,317 (Hyatt, Jr. et al.).

Such keys carry the secondary element, whether it comprises electronic circuitry or some other type of coded data or recognizable pattern, in addition to the key's mechanically operating pattern or bitting. In some instances both mechanical and non-mechanical features of a key are used simultaneously.

Patent No. 5,140,317, referenced above, discloses a combined mechanical lock/key combination Which further includes an electronic feature for permitting opening of each lock in a system of similarly-keyed locks, only when authorized, and with a recording of each lock opening made. The system disclosed in the patent includes a mechanical key with a key cut configuration, and with means for making electrical contact with electronics inside the lock. A separate box is connected by electric wiring to the key, the box including a keypad, a microprocessor, a battery for powering the system and a memory with stored data. The lock includes a retractable blocking means which blocks opening of the lock's bolt, separately from the mechanical bitting, except when prescribed conditions are met. When a solenoid in the lock is activated the blocking means is retracted. The lock also includes its own microprocessor, which controls switching of power to the solenoid, and with a memory within the lock storing data. The microprocessor within the lock compares coded data read from the key with coded data in the memory within the lock, and thus controls powering of the solenoid to situations in which a comparison, made within the lock's microprocessor, determines that coded data read from the key matches coded data in the lock's memory. Also, the lock's microprocessor further calculates a new code for the lock, after each opening of the lock.

The above patent is applicable to coin locks and other situations wherein a mechanical key has bitting matched to a large number of similar locks, but where control of the opening of each lock is desired, and where a record is needed of each lock's opening. The system has been applied to pay telephone coin boxes. However, besides requiring the inclusion of a microprocessor and associated memory within the lock itself, the system of the patent requires additional hardware within the lock casing or the coin box for blocking the opening of the lock except when the microprocessor determines it is proper. The disclosed system thus is applicable only to locks wherein considerable space is available for these added elements, and would be difficult or impossible to implement in situations with little space available. In addition, considerable modification in retrofitting of existing locks is required, increasing cost of implementing the system, in addition to high cost of manufacture and materials.

It is an object of the invention described below to provide a system which is very easily retrofitted into lock systems having a single key operating a number of locks, and which avoids the need for electronics, solenoids or other hardware which would take up space within the coin box or the lock casing adjacent to the lock.

SUMMARY OF THE INVENTION

In accordance with the present invention, a key and lock combination achieves the objectives of security in a coin lock type system wherein a single mechanical key is fitted to a plurality of similarly keyed mechanical lock cylinders. The system of the invention includes a key which is self-contained, with a key head having a microprocessor, memory and battery, as well as a contact point for a one wire bus connection with the lock.

The lock, which may be a coin collection lock for telephones or parking meters or other similar applications, has an electronic access feature which occupies no more space than the mechanical lock itself. Nothing is required outside the lock cylinder, and in fact, in preferred embodiments, all electronics and hardware are contained in the cylinder plug, aside from a small recess or bore which is provided in the cylinder shell.

In a specific embodiment the cylinder plug, in a typical rotatable plug type lock cylinder, contains a one-wire bus connection for contact with the key, a blocking pin which prevents rotation of the plug independently of the mechanical bittings (shear plane tumblers), and an addressable switch for supplying power to the solenoid to release the blocking pin only upon specified conditions being met. A decision as to whether the addressable switch should conduct power to the solenoid is made inside the key, not the lock. Within the key's database is a list of locks, by serial number or code, which are within the system and are normally openable by the mechanical key. Since the locks in the system may only be permitted to be accessed at certain times (the microprocessor preferably includes a clock/calendar) and not more than once by a keyholder on a route, the microprocessor can grant or deny access on these bases. Further, within the database in a preferred embodiment is a list or table associating a secure addressing code for the particular addressable switch with each serial number or coded ID number of a lock. When a lock is "read" by the key, the key's microprocessor determines whether it is appropriate for the lock to be opened at that time, and if so, it sends the approval code back into the lock to effect switching of the addressable switch. This conducts power to the solenoid, releasing the blocking pin.

The one wire bus connection in the cylinder plug may be generally as disclosed in co-pending application Ser. No. 826,206, Pat. No. 5,367,295, and may have a spring-biased, isolated contact which extends forward from a bore in the cylinder plug; alternatively, the isolated contact may be flush with the plug or recessed, so long as the key's contract reaches the lock's contact. The metal of the cylinder plug of course forms a ground connection.

In a preferred embodiment the electronics included on the cylinder plug comprise a "Silicon Serial Number" as manufactured by Dallas Semiconductor, as an ID for the lock. Such an electronic ID device has a coded serial number which is readable by application of a voltage. The Silicon Serial Number may be a laser-etched 64-bit ROM with a 48-bit serial number, powered by the data line with no need for an additional power source. The ID chip requires no standby power to maintain the memory of the serial number. The device is quite small, only about 3.7 mm by 4 mm by 1.5 mm, ideally suited for purposes of the present invention. A second electronic device, connected to the ID device, is the addressable switch. This electronic component, also manufactured by Dallas Semiconductor, is approximately the same size as the ID device. The addressable switch has its own code, and will switch the circuit to conduct power to the solenoid only when it is addressed with the proper code. This particular addressable switch is of a type that resets with a second application of the switch code, which is automatically issued by the microprocessor after a prescribed time delay to allow opening of the lock, e.g. one to three seconds. Means are provided in the circuit, preferably between the addressable switch and the ID device, for preventing reading of the code of the addressable switch from outside the lock. Thus, the key first reads the ID code, identifying the lock which is to be opened, and if opening is authorized, the key sends back the code for the addressable switch, upon which the addressable switch switches the circuit to conduct power from the key through to the solenoid to release the blocking pin. In a preferred embodiment, the opening of each lock is recorded by the microprocessor, in the data storage of the key. Each lock ID in the database is marked as having been opened when that event has occurred, and preferably the time and date are also marked.

The head of the key includes a data port for unloading data from the microprocessor and database, as to locks that were opened on the operator's route and any other pertinent information regarding attempted lock openings, wrong PIN numbers, etc. Also, the key head preferably includes a recharging port for enabling the recharging of a battery within the key head.

Another feature of the invention is a small keypad on the head of the key. This can be used for additional security, to require an operator to input an authenticating code known only to the proper operator. Thus, the key cannot be used by an unauthorized person. The programming of the microprocessor preferably is set so that the operator enters his PIN number at the start of a route wherein a series of locks will be opened. The system can require an updated reentry of the PIN number at various intervals, if desired. Further, if the lock ID read by the key from a lock does not exist in the key's database, the key, which includes a small displayed, can request the operator to reenter his PIN number. Further use of the key can be denied the operator if the newly entered PIN number is not the correct number, or if several locks not existing in the key's database (or not authorized to be opened at the particular time) are attempted.

In one preferred embodiment, the key has a key blade, containing the mechanical bittings, which is removable from the key head. This enables the electronics of a key, or the mechanical bitting of a key, to be changed without producing an entirely new key. Locks may be changed in the manner of typical mechanical locks, by replacing the cylinder, or refitting the mechanical bitting (new sets of tumblers) and changing the cylinder plug.

It is thus seen that the mechanical/electronic lock and key of the invention provides, in an extremely compact fashion, electronic access control to a conventional mechanical lock. No additional space in a lock is required to implement the system of the invention. The system is particularly useful where a single key is matched to a number of locks, and a key of the invention has onboard microprocessor, database and battery so that all comparison and decision making as to access is performed in the key itself, without requiring any microprocessor or data storage within the lock. Only a "slave" unit is included in the cylinder, responding to what the "master" (the key) sends. There are not intelligence capabilities in the lock itself. These and other objects, advantages and features of the invention will be apparent from the following description of a preferred embodiment, considered along with the accompanying drawings.

DESCRIPTION OF THE DRAWINGS

FIG. 4 shows a blocking pin associated with the electronic access control features, the pin being retracted.

DESCRIPTION OF PREFERRED EMBODIMENTS

Figure 1:
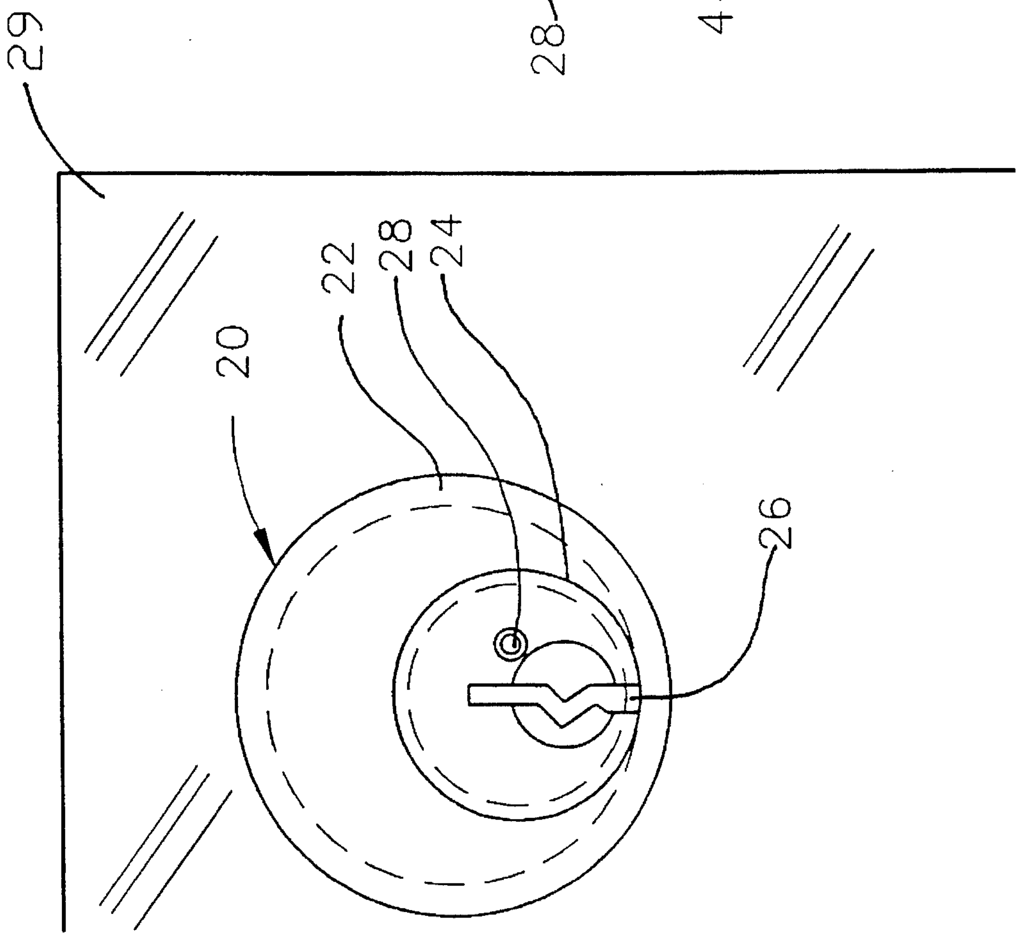
FIG. 1 is a front elevation view showing a conventional mechanical lock cylinder of the pin tumbler type, as an example of an application of the invention, fitted with a one wire bus contact as part of the system of the invention.

FIG. 1 shows a conventional lock cylinder 20 which may be of the pin tumbler type, with a face plate 22 and a cylinder plug 24 which includes a keyway or key slot 26 and an electrical contact 28 which is isolated from the metal of the plug 24. The contact 28 may be formed in accordance with copending Ser. No. 836,206 (Pat. No. 5,367,295), where the contact is disclosed as being spring-biased for engagement with a contact on a key; it can take other forms, so long as it is positioned to be engaged by a mating contact from the key. The cylinder 20 is mounted in an area to be secured 29, or a lock casing.

Figure 2:
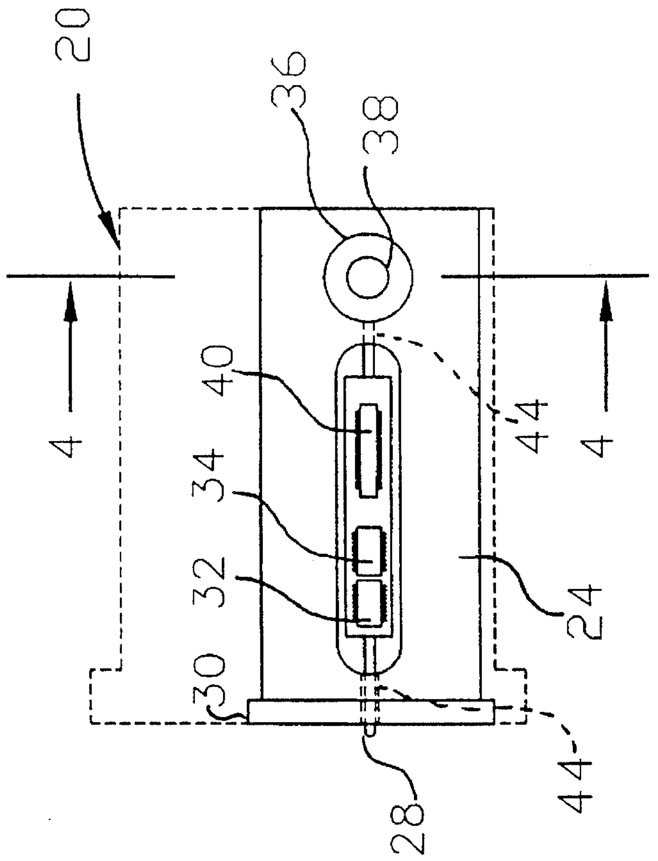
FIG. 2 is a schematic side View showing a cylinder plug of the lock cylinder of FIG. 1, showing access control components of the invention and indicating in dashed lines the cylinder shell surrounding the cylinder plug.

FIG. 2 shows the lock cylinder 20 in dashed lines and shows the cylinder plug 24 in side elevation. FIG. 2 shows that the cylinder plug 24 has a head 30 of somewhat greater diameter, as is conventional. The contact 28, which establishes a one wire bus protocol for electrical connection to the key, with the metal of the plug serving as ground, is connected to components 32 and 34 and, when so switched, to a solenoid 36 which is effective to retract a blocking pin 38 when energized. Further electrical components are shown in the circuit at 40 and are discussed below.

As can be seen from FIGS. 2, 3, 4, 5 and 6, the components 32, 34 and 40 preferably are positioned in a flat or recess 42 in the surface of the cylinder plug 24. These drawings show the conductive path 44 from the external contact 28 through the components 32, 34 and 40 to the solenoid 36, in dashed lines. The conductive path includes the component 34, which comprises an addressable switch as noted above. This component may be the addressable switch identified as Model No. DS2405 by Dallas Semiconductor. This addressable switch is quite small and requires no standby power, and comprises an open drain N-channel transistor that can be turned on or off by matching the 64-bit factory-lasered registration number within the component. Each addressable switch, for each different lock in the system, has a unique 48-bit serial number, as well as an 8-bit cyclic redundancy check and an 8-bit family code. It is operated with a one-wire protocol, so that power can be put through the switch using the same line used to convey data. The addressable switch, preferably the DS2405 noted, is a lave device to be operated by a bus master. The switch 34 is controllable by addressing, between a state wherein it is switched "on" to the components 40 and ultimately to the solenoid 36, or an "off" state wherein the connection to the components 40 and 36 is not made. The identified addressable switch, the DS2405, is switched "on" by a first address, comprising transmitting of the 64-bit registration number as data to the switch, and it is switched "off" by a second application of the same data.

The electronic ID device 32 may comprise a Dallas Semiconductor Part No. DS2401 Silicon Serial Number. Its dimensions are the same as those of the addressable switch 34, noted above. Again, zero standby power is required to this component, thus eliminating the need of any standby or continuous power in the cylinder plug. It operates in an approximately 2.8 to 6.0 voltage range, and it will transfer data through a single data lead (with ground return), the same lead that is used to supply power to the solenoid 36. The ID device 32, i.e. the DS2401, has an internal ROM accessed via the single wire data line. Like the addressable switch 34, the component 32 has a 64-bit registration number, including an 8-bit family code, a 48-bit unique serial number and an 8-bit CRC tester, and no two DS2401 components are alike. Also like the addressable switch 34, the ID device 32 is a slave device, with the bus master being a microcontroller. Its function is to allow the reading of its unique serial number.

Figure 3:
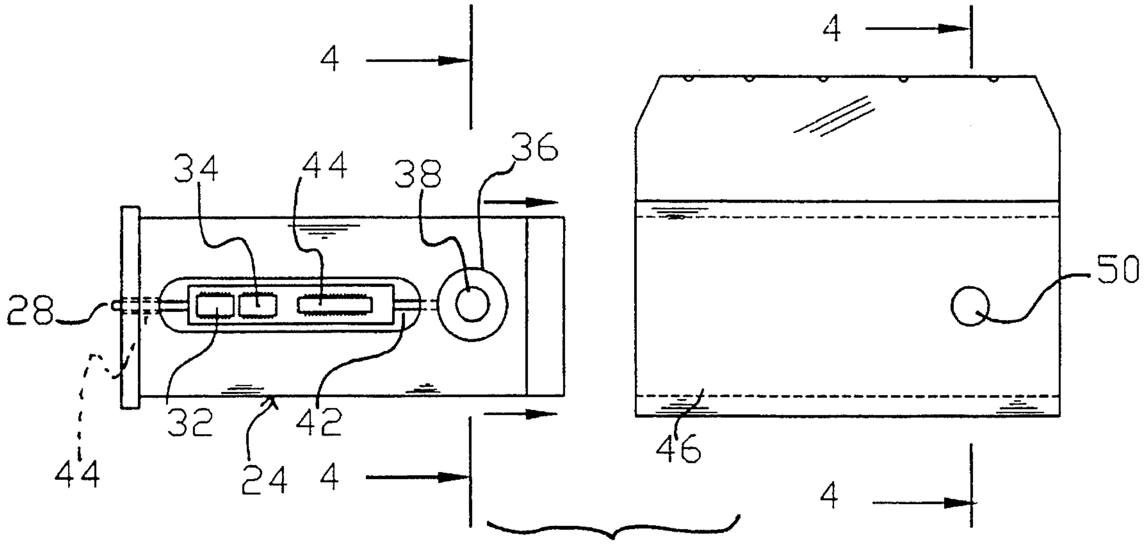
FIG. 3 is a side elevation view similar to FIG. 2, but exploded in form and showing a cylinder plug as removed from a cylinder shell, in a knob lock type of cylinder.
Figure 4:
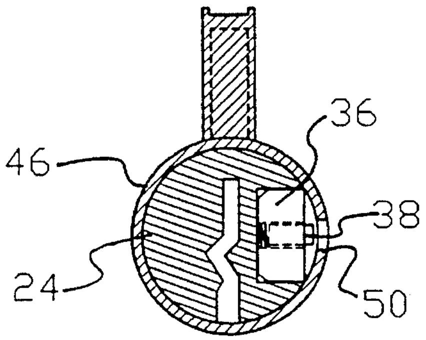
FIG. 4 is a sectional elevation view taken through the cylinder plug and cylinder shell, as seen generally along the line 4—4 in FIG. 2.
Figure 5:
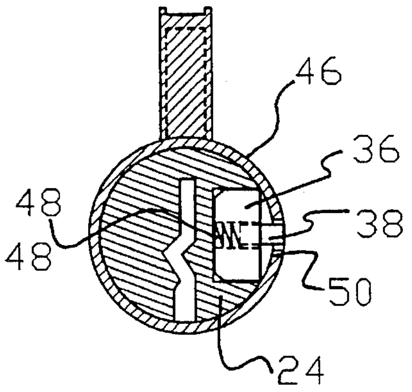
FIG. 5 is a view similar to FIG. 4, as viewed generally along the same line in FIG. 2, but showing the blocking pin extended and blocking rotation of the cylinder plug.

As seen in the cross-sectional views of FIGS. 4 and 5, the cylinder plug 24 is rotatable within the cylinder shell 46 only when the blocking pin 38 has been retracted by the solenoid 36. The pin 38 is biased outwardly by a compression spring 48, to the position shown in FIG. 5 which prohibits rotation of the plug 24. The small solenoid 36 when powered overcomes the force of the compression spring 48. FIGS. 4 and 5, and also FIG. 3, show a bore or recess 50 into which the blocking pin 38 extends in the blocking position. This bore, recess or groove 50 is the only modification required in the entire lock, other than those on the cylinder plug 24 itself. The bore or recess 50 is easily formed by drilling a hole through the cylinder shell 46 or forming an internal recess or groove on the inside surface of the cylinder shell. Preferably the bore 50 passes through the shell, as shown in FIGS. 3–5.

The invention allows for secondary locking "high security" mechanical features, generally located in a side of the cylinder plug. These can be located on the opposite side of that shown in FIG. 3. Examples of such features are Schlage Primus and Medeco Biaxial.

Figure 6:
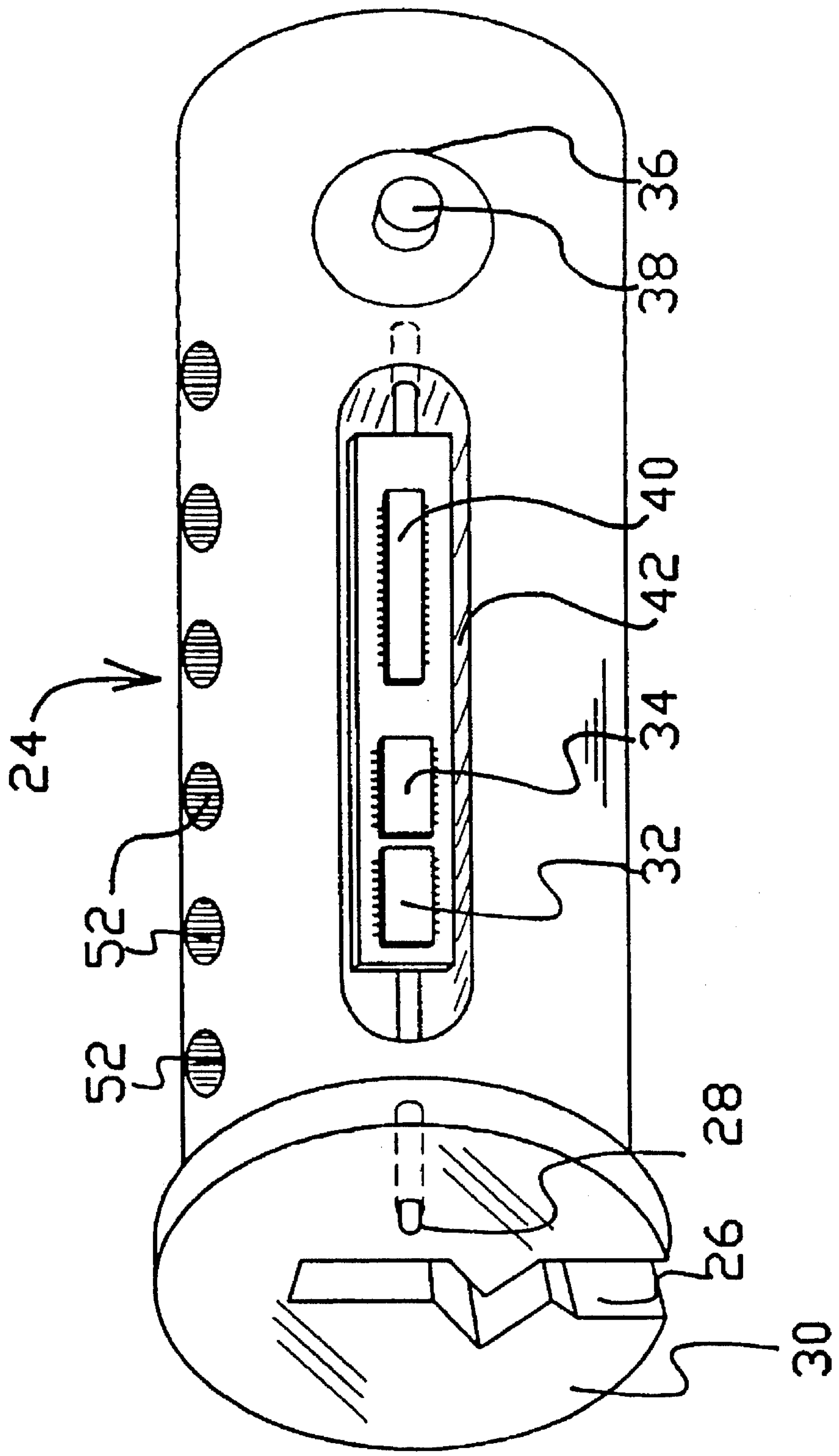
FIG. 6 is a perspective view showing the cylinder plug of FIGS. 2 through 5, and indicating the one wire bus contact, the electronic components and the solenoid-activated blocking pin, as well as a series of bores for conventional pin tumblers.

FIG. 6, showing the cylinder plug 24 without the shell 46, indicates tumbler bores 52 in the upper side of the plug, for the conventional pin tumbler mechanical bittings.

Figure 7:
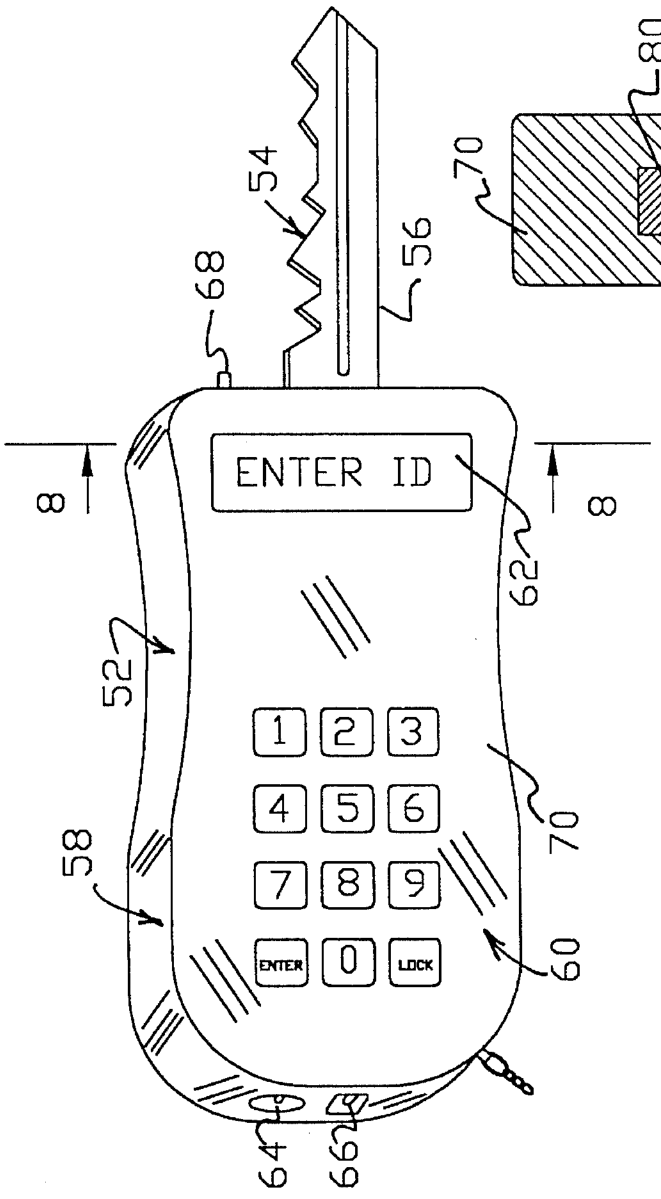
FIG. 7 is a perspective view, somewhat schematic, showing a mechanical key, forming a part of the system of the invention, the key including a mechanical key blade and a key head with keypad and electronics.

FIG. 7 shows a mechanical key 52 which has a mechanical bitting pattern, i.e. a key cut 54 on a key blade 56, matched to the lock including the cylinder 20 and plug 24. The mechanical key bitting is matched in a preferred system to a large number of similar locks, such as locks to coin boxes for pay telephones, parking meters, vending machines or other secured areas where control is desired as to the timing and frequency of access to a secured area. The key 52 with its bitting 54 can be a master key which is matched to a number of secure locks, but which requires use by a properly authenticated keyholder and wherein access is to be granted only when prescribed conditions are met. The key 52 has an enlarged key head 58, sufficient to contain internal electronic components and to also have an external keypad 60 and, preferably, a small display 62. At a back end of the key head are a data port 64 and a battery recharge port 66. The front of the key head has a one wire bus contact 68, isolated from the metal of the key blade 56 and positioned to engage the contact 28 positioned at the front of the cylinder plug 24. The key head is encased in a plastic or elastomeric casing 70.

Figure 9:
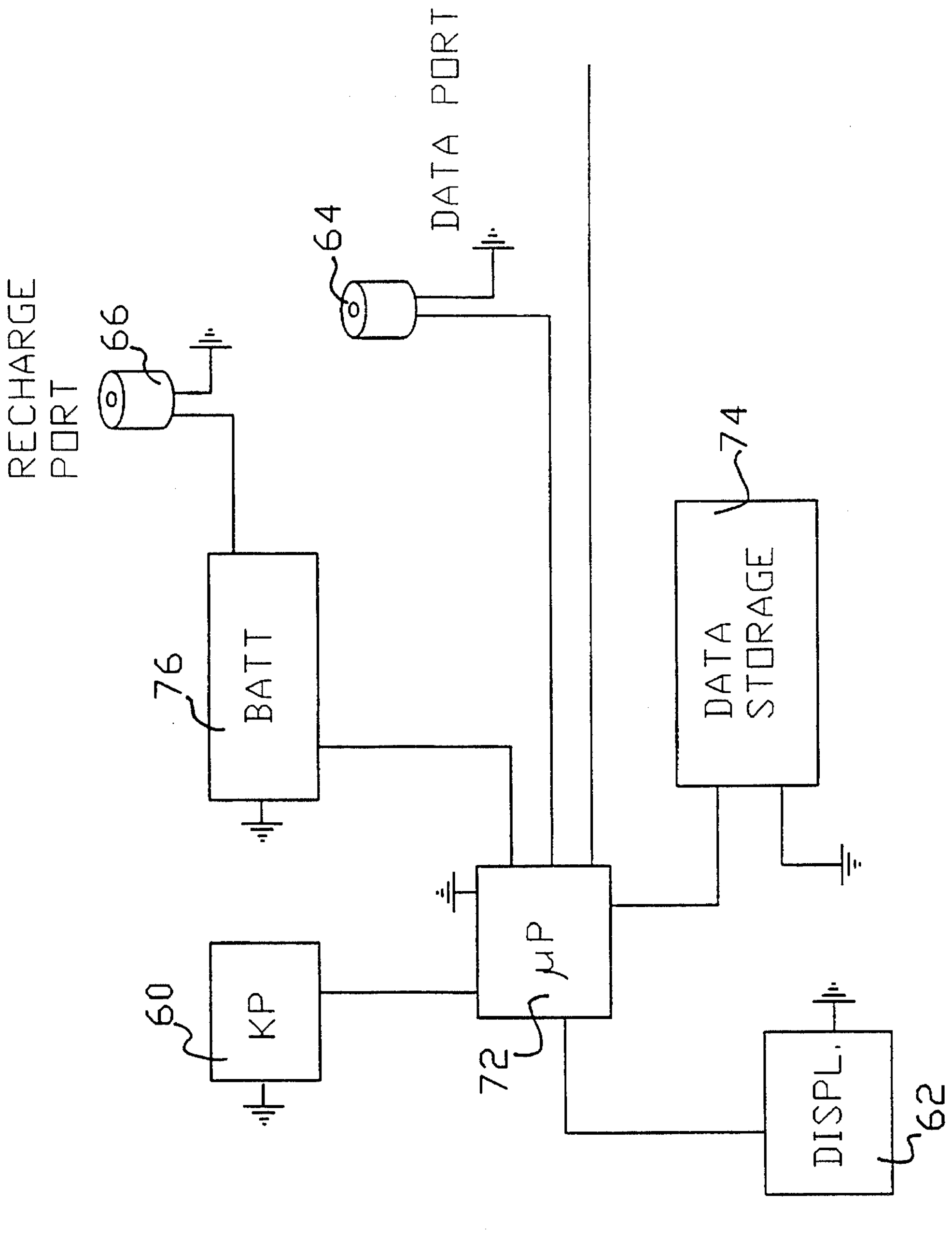
FIG. 9 is a schematic block diagram showing components of a mechanical/electronic key which forms a part of the invention.

FIG. 9 is a schematic block diagram showing components of the key head 58. The external single wire bus contact 68 is connected to a microprocessor 72 within the key head. The processor 72 is connected to the keypad 60, the display 62 (which may be an LCD or LED), a data storage device or database 74, a battery 76 and the data port 64 and battery recharge port 66. The microprocessor 72 may comprise, for example, an MC684CII, including EEPROM and RAM data storage (74) manufactured by Motorola. The keyboard 60 may be about ½ inch by ¾ inch in overall size, so that it is best operated using a pencil, pen or stylus. The display 62 may be approximately ⅝ inch in length. The overall size of the key head 58 may be about two inches in length, one inch in width and about ¼ to 5/16 inch in thickness.

Figure 8:
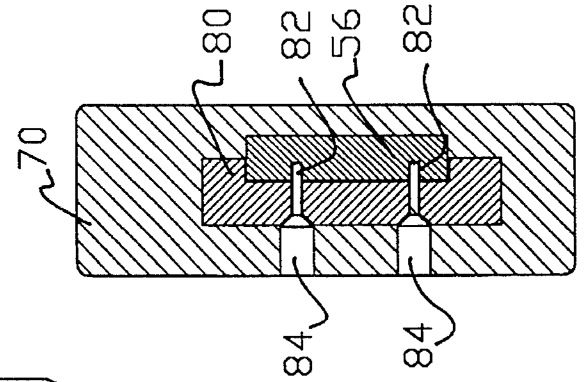
FIG. 8 is a sectional view through the key of FIG. 7, as seen generally along the line 8—8 in FIG. 7, showing a means for interchanging of the key blade.

FIG. 8 shows in cross section one arrangement by which the key blade 56 may be interchangeable for a different key blade. As shown, the key blade 56 may be secured into a closely fitted groove or recess of a metal head portion 80 of the key, which extends partway into the key near 58 and which is tightly secured into the plastic casing 70. Small machine screws 82 are used to secure the key blade 56 into the metal head portion 80, which has threaded bores. As indicated, openings 84 may be provided through the plastic casing for access to the heads of the machine screws 82. Thus, if a system of locks and the key 52 are to be fitted with new mechanical bittings, the entire key 52, with the internal electronics, display and keypad, need not be replaced. A different blade 56 may be interchanged, with corresponding bitting changes to the cylinder plug 24 and shell 46, and in the field a simple replacement may be made of the plug and shell combination in each lock of the system (with rekeying of removed plugs/shells done elsewhere).

Figure 10:
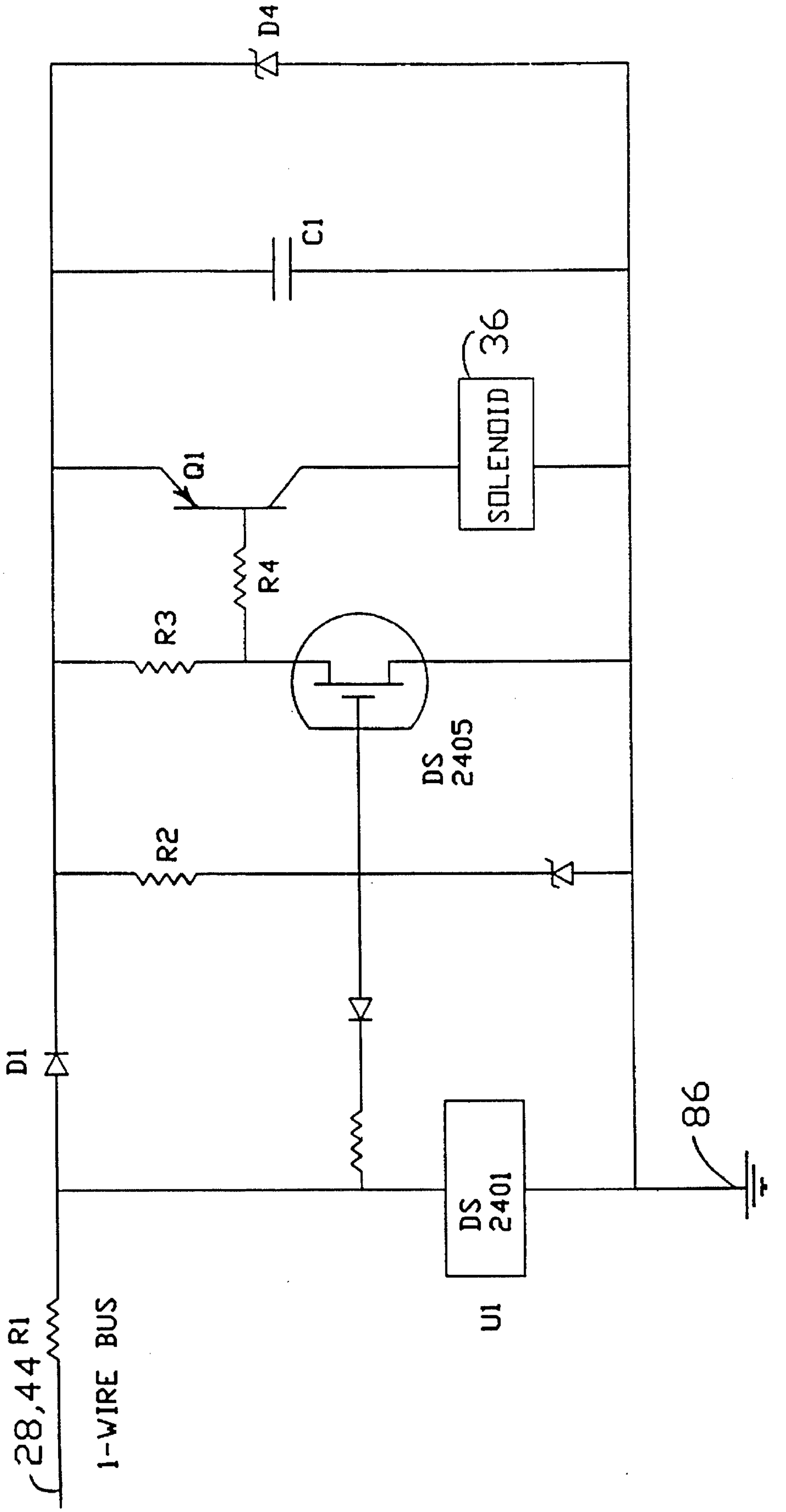
FIG. 10 is a schematic circuit diagram indicating components on the cylinder plug, for controlling the blocking pin.

FIG. 10 is a schematic circuit diagram for the components in the cylinder plug. As indicated, the one wire bus comes in at 28, 44, with ground at 86. The ID device 32 is shown at $U_1$ in the circuit diagram, identified as DS2401 for the preferred embodiment described. This comprises a low cost electronic registration number device as noted above, providing a completely unique identity as a slave device, which can be read by the master (the key assembly). The addressable switch 34 is shown at $U_2$ in the diagram, DS2405 in this embodiment, an open drain N-channel transistor that is turned on or off by matching the 64-bit factory-lasered registration number with data sent from the key. This registration number is indexed in the data storage 74 of the key, in combination with the number of $U_1$, the ID device. The $U_1$ ID can be read by the master, but the number of the $U_2$ switch cannot be read, because of the diode shown at $D_2$.

The master, i.e. the electronics of the key including the microprocessor 72, sends a voltage to the one wire bus 28 and thus reads the unique number within the ID device $U_1$. Using this number the microprocessor looks up in its database 74 an associated number, which is the unique number of $U_2$, the addressable switch. As explained herein, this can be coupled with another query, such as whether the lock is authorized to be opened based on date and time or previous opening of the lock which may have occurred. The data matching the $U_1$ number to the $U_1$ number, as well as any data regarding authorized dates and times, operator's PIN number, etc., have been loaded into the data storage of the key via the data port 64, by management prior to the operator's beginning his route. After looking up this address number or code from the database, assuming opening is authorized, the microprocessor sends the number on the one wire bus to $U_2$, to turn on the addressable switch. When $U_1$ is properly addressed, Darlington transistor $Q_1$ is turned "on", causing power to be supplied to the solenoid 36. Component 40 in FIGS. 2, 3 and 6 represents all electrical plug components except for $U_1$ and $U_1$ (although not all such components will be positions in the order shown). The term "addressable switch means" in the claims in intended, as applied to this described embodiment, to include the components $U_1$ and $Q_1$. When the solenoid is powered the blocking pin 38 (FIGS. 3–6) will be released, i.e retracted, and the operator will be able to rotate the key in the lock, since the key bittings 54 will match the bittings of the lock cylinder. The operator is thus able to gain access to the locked area, such as a coin box. The master, i.e. the microprocessor 72, sends the unique number again to $U_1$ to turn off $U_2$ and $Q_1$, stopping the current to the solenoid and allowing the compression spring to push the blocking pin outwardly when the cylinder plug is returned to the locked position. During this transaction, a record is made in the database 74 by the microprocessor 72, indicating that the particular lock, by serial number, has been accessed. The record can include the date and time, since the microprocessor will include a clock.

The required power is supplied by the master through the diode $D_1$. The capacitor $C_1$ is used to maintain the supply of voltage during low times of the one wire bus.

$R_1$, $D_3$ and $D_4$ are used for reverse polarity and high voltage protection.

Figure 11:
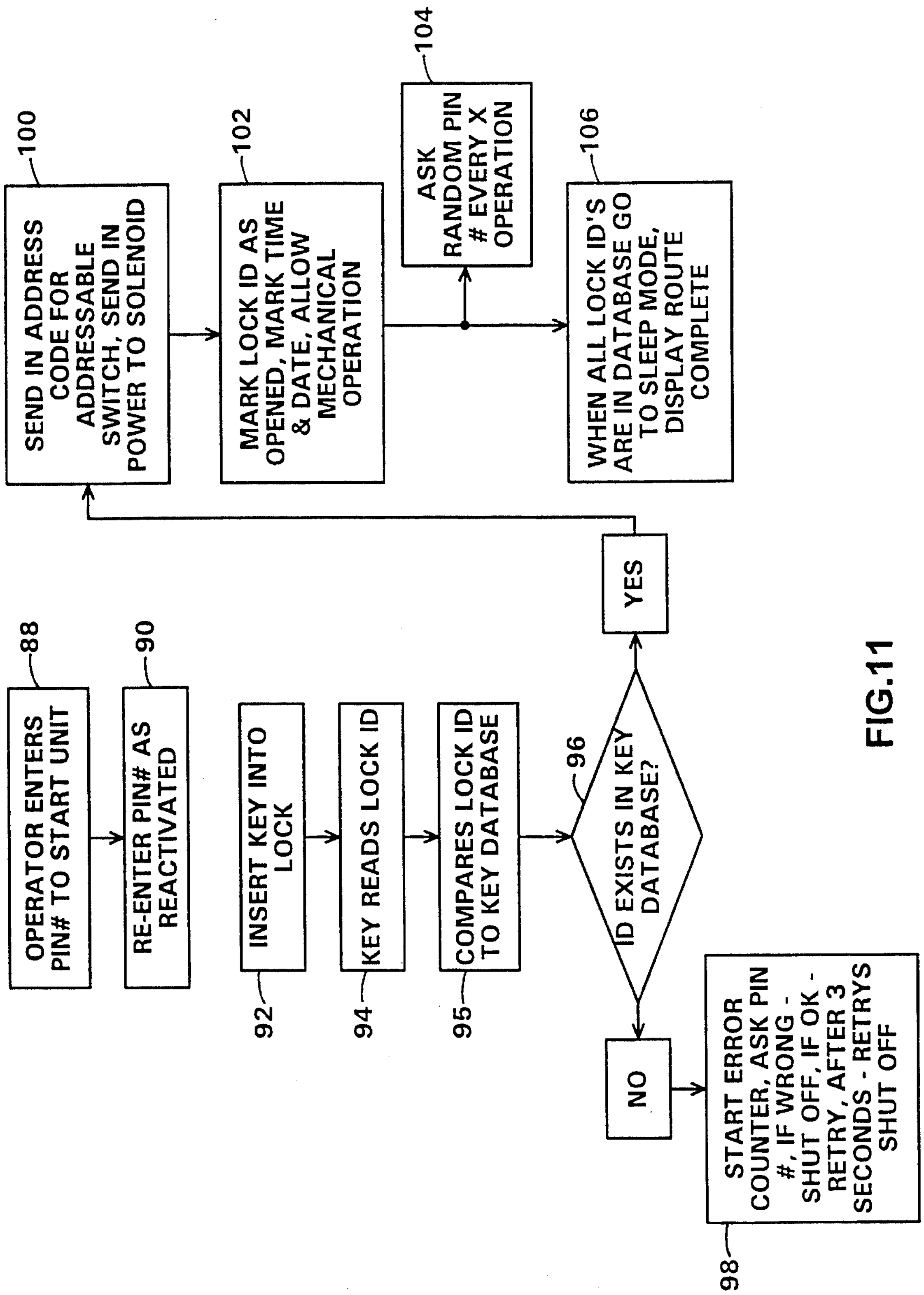
FIG. 11 is a flow chart indicating steps in use of the mechanical/electronic key and lock of the invention.

FIG. 11 shows in flow chart form the procedure for use of the key 52 and indicates internal processing which results in the decision whether to grant access. As can be seen in the first block 88 of FIG. 11, the operator first enters his personal identification number (PIN) to start or activate the key unit. The microprocessor is programmed to deny access to all locks unless an authorized PIN number is entered, as determined in the database or data storage 74 (FIG. 9). The next block 90 in FIG. 11 indicates that the operator must reenter his PIN number after a prescribed period of time has passed, particularly if the key has not been used, in order to reactivate the system within the key.

On the route using the key 52, such as a coin collection route involving pay telephones, parking meters or the like, the operator inserts the key into a lock on the route, as indicated in the block 92 of the diagram. The key device reads the lock ID (block 94), using the microprocessor 72 and a voltage applied through the one wire bus connection into the data line, power being supplied by the onboard battery 76. The serial number of the ID device 32 is read when the voltage is applied. As noted in the block 95, the microprocessor in the key compares the read lock ID to the onboard database, to determine whether that lock ID exists in the key database (decision block 96). If the ID read from the lock does not exist in the database, the block 98 indicates that an error counter is started. The key's display 62 will indicate to the operator to again enter his PIN number (as noted by the displayed message in FIG. 7). If the PIN number is not authorized, the system is shut down. If it is authorized, the operator may retry a preselected number of times, such as three times as indicated in the diagram.

Implicit in the box 96 is a further function of the microprocessor as released to the database. As noted above, the microprocessor in a preferred embodiment will determine whether this particular lock is authorized to be opened. This decision may be made based on whether the lock has already been opened once before, since the last downloading of data from the key, which might indicate that the operator is attempting to make an unauthorized further collection of coins on his own behalf. The system, if desired, could also discriminate on the basis of date and time when the operator is supposed to be opening this lock; on the basis of the identity of the operator in accordance with the PIN number entered; or on other bases.

If these other conditions are met, the microprocessor sends the addressable switch code associated in the database with this particular lock ID, into the data line or one wire bus connection. This is indicated in the block 100 in FIG. 11. When this address code is sent to the addressable switch (34 in FIGS. 2–6), this activates the addressable switch to switch "on", sending the power existing in the line to the solenoid 36. The lock may then be opened.

The block 102 in FIG. 11 shows that the microprocessor marks the particular lock ID as having been opened, in the database. Also recorded in a preferred embodiment is the time and date.

The block 104 in the diagram indicates that the display 62 (FIG. 7) prompts the operator to enter his PIN number again at a selected frequency, such as after each instance of a given number of locks being opened, or at random times. This provides additional security against an unauthorized person using the key, such as by theft from the authorized operator. Also, for added security, the key preferably has an internal tamper switch which prevents key function entirely, when the key cover is opened, requiring reset by specific codes.

The block 106 indicates that When all lock IDs for the group of locks in question have been marked in the database as having been opened, the system preferably goes into a "sleep" mode, minimizing power requirements, and shows on the display 62 that the route has been completed.

Figure 12:
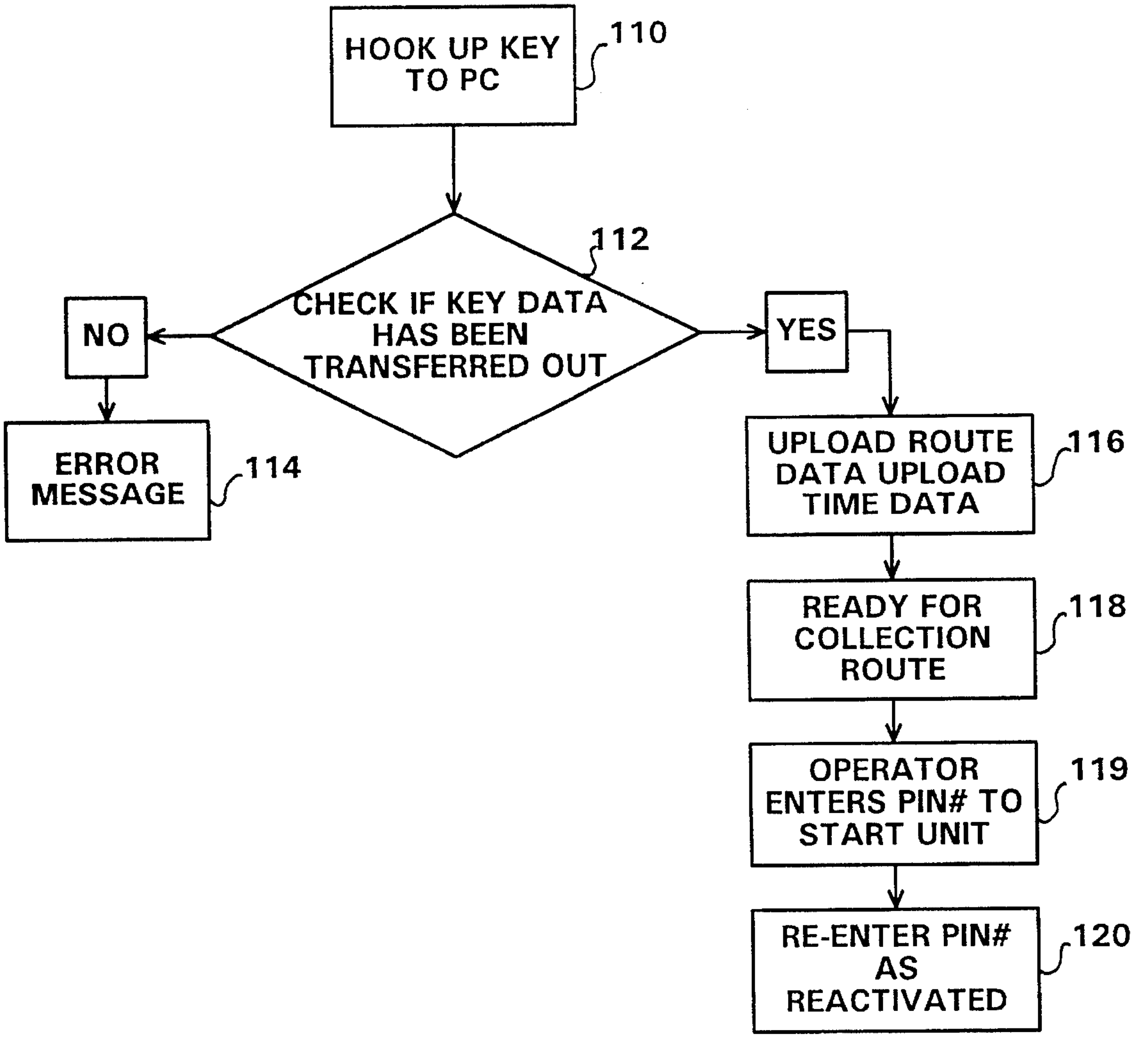
FIG. 12 is another flow chart, indicating transfer of data between a computer and the microprocessor and data storage on the key of FIG. 7.

The flow chart of FIG. 12 shows the transfer of data between the key 52 (FIG. 7) and a management computer or the main computer, which may be a PC, is not specifically shown in the drawings. A block 110 shows that the key is connected to the computer or PC, via the data connection or port 64. Upon the operator's returning to the office or central location, the information concerning what locks have been opened is first downloaded to the PC, that step not being shown in FIG. 12. Other data can be downloaded as well, such as the amount of money collected at each stop on the route, in the case where the parking meters or other coin locks have a means of storing this data. Such data can be transferred to the conductive path of the lock by use of an extending wire as disclosed in copending Ser. No. 836,206, U.S. Pat. No. 5,367,295, incorporated herein by reference.

FIG. 12 indicates in the block 112, that the PC first checks to see if the key's route data has been transferred out. If no, an error is indicated (114), since new route data should not yet be entered. If yes, the PC transfers new route data into the key's database, and also uploads time data as indicated at 116, i.e. dates and times or periods within which the locks are permitted to be opened. Authorized operators PIN numbers can also be uploaded at this point. The route data will again include a set of locks which are to be opened in an operator's route. Once the new data is uploaded, the key 52 is ready for use in a collection route (or use in another series of similarly-keyed locks). This is indicated at 118. As noted, the operator enters his PIN number (119) to start the key unit, and is prompted to reenter the PIN number (block 120) when the system needs to be reactivated, which can be based on time passage or on the microprocessor's randomly requesting re-entry of the PIN number.

The system of the invention can be slightly modified to operate in other ways, the most important features being that the blocking pin 38, solenoid 36 and operating devices are located within the lock itself, without requiring any further space around the lock or in a lock casing; in the case of a conventional rotatable cylinder plug and surrounding cylinder shell, all components are contained on the plug itself, with only an opening, groove or recess required to be provided in the cylinder shell, as outlined above. One example of a different operating mode involves manual entry of each lock's ID, by the operator. For instance, if a series of parking meters bear exterior, readable numbers, the system could require the operator to enter the parking meter number on the keypad 60 of the key, as each parking meter is approached. A prompt can be issued on the display. The database can be similar to that described above, with an addressable switch code tied to each parking meter number within the database. The decisions as to authorized opening can also be the same, made by the microprocessor within the key head. If opening of the lock is authorized, the key can send a signal to the addressable switch 34 (comprising that switch's ID code as looked up in the database), causing the switch to turn "on" and thus powering the solenoid 36 to retract the pin 38. In this case the readable ID device 32 would not be needed, but nonetheless can still be included within the lock (on the cylinder plug 24 in the illustrated embodiment), so that the system can be capable of several different modes of operation. Protection against external reading of the addressable switch code can be included as described above. The external loading of data into the data port 64 can include programming or changing mode via the key's processor 72, to indicate whether numbers are to be manually entered or whether they should be read automatically as described earlier. The operation is based on the same master-slave relationship as described above, but with manual entry of lock numbers rather than automatic reading of the lock's ID.

The above described preferred embodiments are intended to illustrate the principles of the invention, but not to limit its scope. Other embodiments and variations to this preferred embodiment will be apparent to those skilled in the art and may be made without departing from the spirit and scope of the invention as defined in the following claims.

We claim:

1. A lock and key with a mechanical lock configuration as well as an electronic security feature comprising:

a lock including a metal lock cylinder for releasing the lock, the lock cylinder comprising
- (a) a cylinder shell,
- (b) a cylinder plug rotatable within the cylinder shell and having a keyway,
- (c) a series of mechanical locking elements acting between the cylinder plug and the cylinder shell, and having a specific mechanical bitting pattern,
- (d) a blocking pin independent of the mechanical locking elements positioned in a bore of the cylinder plug for in and out reciprocal movement in the bore and being contained essentially within the bore of the cylinder plug in a retracted condition and extending partially outwardly from the bore of the cylinder plug in a blocking condition, (e) a recess in the interior of the cylinder shell, positioned such that the blocking pin will engage in the recess in said blocking condition to prevent rotation of the cylinder plug, (f) electromagnetic release means in the cylinder plug for retracting the blocking pin to the retracted condition upon communication of electrical power to the electromagnetic release means, and means for normally holding the blocking pin in the blocking condition, when electrical power is not communicated to the electromagnetic (g) electrical conductive path means, including an external contact isolated from the metal of the lock cylinder, for communicating electric power from the exterior of the lock cylinder to the electromagnetic release means with the body of the cylinder acting as a ground, and (h) electronic means positioned in the conductive path means, for restricting communication of electric power to the electromagnetic release means and for conducting such power to the electromagnetic release means only when a prescribed data signal is received by the electronic means, mechanical key means fitted for insertion into the lock cylinder, comprising (a) a key blade with mechanical bitting matched to said mechanical bitting pattern of the lock cylinder, (b) a battery of sufficient capacity to power said electromagnetic release means to retract the blocking pin, (c) microprocessor means powered by the battery and data storage means connected to the microprocessor means, and (d) contact means for engaging with said external contact of the lock cylinder to thereby connect with the conductive path means including the electronic means in the lock cylinder in a one-wire bus connection, said electronic means including ID means storing an identification code for the lock, and addressable switch means connected to the electromagnetic release means and to the ID means, for switching on power from the mechanical key means to the electromagnetic release means only when said prescribed data signal is received, and said microprocessor means including means for reading the code of the ID means when the mechanical key means is inserted into the lock and said one-wire bus connection is made, and for looking up in the data storage means the lock ID code read from the lock to determine whether the lock is a lock authorized to be opened, and if so, for looking up a switch code associated in the data storage means with the lock ID code and sending the switch code as said prescribed data signal into the conductive path means, so that the switch code is sent to the addressable switch means and is thereby effective to cause the addressable switch means to switch power to the electromagnetic release means to retract the blocking pin permitting the cylinder plug to be rotated to open the lock.

2. The apparatus of claim 1, wherein the ID code means comprises an externally readable ROM-stored registration code.

3. The apparatus of claim 1, wherein the addressable switch means comprises an ROM storing a registration code and means for changing the addressable switch means from an "off" state to an "on" state when the addressable switch means receives the registration code on a data line.

4. The apparatus of claim 1, wherein the electromagnetic means comprises a solenoid, and including a spring urging the blocking pin toward the extended, blocking position, the solenoid being effective to retract the blocking pin when powered.

5. The apparatus of claim 1, wherein the key means includes a key head directly affixed to the key blade with said mechanical bitting, the key head including said microprocessor means and data storage means, whereby the key means is self-contained and need not be connected to any further device for opening the lock.

6. The apparatus of claim 5, further including a keypad and a display on the key head, and means associated with the microprocessor and the data storage means for preventing the key means from sending said prescribed data signal to the lock unless and until a user enters a prestored personal identifying number into the keypad.

7. The apparatus of claim 6, further including means associated with microprocessor means for displaying instructions to the user on said display.

8. The apparatus of claim 1, wherein said external contact of the lock cylinder comprises a spring-loaded contact positioned in a bore in the cylinder plug, adjacent to the keyway, and wherein said contact means of the mechanical key means is positioned to engage with the external contact of the lock when the key blade is fully inserted into the keyway.

9. The apparatus of claim 1, wherein the ID means comprises an ROM device positioned within the cylinder plug and wherein the addressable switch means is also positioned within the cylinder plug.

10. The apparatus of claim 9, wherein the addressable switch means comprises a Dallas Semiconductor DS2405 addressable switch.

11. The apparatus of claim 1, wherein the key means includes a key head directly affixed to the key blade, the key head including said microprocessor means and data storage means as well as a power recharge port for the battery and data port means for facilitating the input of data into and output of data out of the keyhead and to the microprocessor and data storage means regarding a plurality of locks which are openable by the key means, the input data including an association between each lock ID and a code for the addressable switch means of that lock.

12. The apparatus of claim 1, further including a plurality of similar locks each in accordance with claim 1, each having the same mechanical bitting pattern such that said key blade matches the bitting pattern, and said electronic means of each lock including an ID means with a different and unique identification code within the plurality of locks, and the addressable switch means of each lock in the system being responsive to a different and unique prescribed data signal is within the plurality of locks.

13. The apparatus of claim 1, wherein said electrical conductive path means and said electronic means are positioned on the cylinder plug along with the electromagnetic release means and the blocking pin, whereby all electronics and the blocking pin are contained on the cylinder plug, occupying no space outside the lock cylinder itself.

14. The apparatus of claim 1, wherein the addressable switch means includes means for switching from an "on" condition back to an "off" condition when said prescribed data signal is again received.

15. The apparatus of claim 1, wherein the lock includes means for preventing reading of said prescribed data signal associated with the addressable switch means, from outside the lock.

16. The apparatus of claim 5, wherein the mechanical key means includes means for removing and replacing the key blade from the key head.

17. The apparatus of claim 16, wherein the key head includes a metal bow portion with a slot, and the key blade being fitted within said slot.

18. A lock and key system with electronic access control, comprising:

a mechanical lock mounted in an area to be secured, with a lock cylinder, a keyway and mechanical bittings which must be matched by the bittings of a key to permit opening of the lock, the lock including a blocking means independent of the mechanical bittings for preventing motion which would open the lock, except when the blocking means is released, release means within the lock for releasing said blocking means upon power being conducted to the release means, contact means at the exterior of the lock for conducting power into the lock, key means separate from the lock, including a key blade with mechanical bittings matched to the bittings of the lock, the key means including a key head and lock contact means for making electrical connection with said contact means of the lock, the key head including a microprocessor and associated data storage containing data concerning locks to which the key is matched, and including a battery, the microprocessor in the key head including means for directing power via the contact means into the lock, when the key blade is inserted into the lock's keyway, means for receiving a lock ID signal from the lock via the contact means, and means for supplying power via the contact means to the release means, only upon a preselected condition being met as determined by the microprocessor means, to allow the lock to be opened, preselected condition being that the lock ID signal is indicated in said data storage as a lock authorized to be opened, and the blocking means and release means being contained entirely within the lock cylinder and occupying substantially no additional space within the area to be secured.

19. The system of claim 18, including switch means within the lock for switching "on" or "off" power to the release means.

20. The system of claim 19, wherein said switch means comprises an addressable switch having an address code and having means for switching to an "on" condition when the switch code is received via the contact means.

21. The system of claim 20, wherein the microprocessor includes means for sending a data signal comprising said switch code to the addressable switch means via the contact means, upon said preselected condition being met as determined by the microprocessor means.

22. The system of claim 18, wherein the lock further includes a readable ID means connected to said contact means, for enabling the microprocessor to read a lock ID when the key is in the lock's keyway, and addressable switch means connected to the contact means, for connecting the contact means to the release means when a switch code is received by the addressable switch means, and said data storage in the key head including an addressable switch code associated with a lock ID for each lock in the system, so that when the microprocessor reads a lock ID, it can send data comprising said addressable switch code for the particular lock back into the lock via the contact means, to switch the addressable switch means "on" and thus to send power to the release means to allow the lock to be accessed.

23. The system of claim 18, wherein the key head further includes a keypad, and wherein the microprocessor includes means for preventing opening of a lock in the system unless an operator has entered a pre-stored, secure personal identification number for the operator.

24. The system of claim 23, wherein said preselected condition comprising the microprocessor's determination, based on information in the data storage, that the lock is authorized to be opened when the key blade is inserted into the keyway, by an operator using said secure personal identification number.

25. The system of claim 23, wherein said preselected condition comprises the microprocessor's determination that the lock is authorized to be opened at the time the key blade is inserted into the keyway.

26. A lock with a mechanical lock configuration as well as an electronic security feature, comprising:

a lock including a metal lock cylinder for releasing the lock, the lock cylinder comprising (a) a cylinder shell, (b) a cylinder plug rotatable within the cylinder shell and having a keyway, (c) a series of mechanical locking elements acting between the cylinder plug and the cylinder shell, and having a specific mechanical bitting pattern, (d) a blocking pin, independent of the mechanical locking elements positioned in a bore of the cylinder plug for in and out reciprocal movement in the bore and being contained essentially within the bore of the cylinder plug in a retracted condition and extending partially outwardly from the bore of the cylinder plug in a blocking condition, (e) a recess in the interior of the cylinder shell, positioned such that the blocking pin will engage in the recess in said blocking condition to prevent rotation of the cylinder plug, (f) electromagnetic release means in the cylinder plug for retracting the blocking pin to the retracted condition upon communication of electrical power to the electromagnetic release means, and means for normally holding the blocking pin in the blocking condition, when electrical power is not communicated to the electromagnetic release means, and (g) electrical conductive path means, including an external contact isolated from the metal of the lock cylinder, for communicating electric power from a key fitted to the lock cylinder and inserted therein, to the electromagnetic release means with the body of the cylinder acting as a ground.

27. The lock of claim 26, further including electronic means positioned in the conductive path means, for restricting communication of electric power to the electromagnetic release means and for conducting such power to the electromagnetic release means only when a prescribed data signal is received by the electronic means from the key.

28. A lock and key system with electronic access control, comprising:

a mechanical lock mounted in an area to be secured, with a lock cylinder, a keyway and mechanical bittings which must be matched by the bittings of a key to permit opening of the lock, the lock including a blocking means independent of the mechanical bittings for preventing motion which would open the lock, except when the blocking means is released, release means within the lock for releasing said blocking means upon power being conducted to the release means, contact means at the exterior of the lock for conducting power into the lock, key means separate from the lock, including a key blade with mechanical bittings matched to the bittings of the lock, the key means including lock contact means for making electrical connection with said contact means of the lock, the key means including a microprocessor and associated data storage containing data concerning locks to which the key is matched, and including a battery, the microprocessor in the key means including means for directing power via the contact means into the lock, when the key blade is inserted into the lock's keyway, means for receiving a lock ID signal from the lock via the contact means, and means for supplying power via the contact means to the release means only upon a preselected condition being met as determined by the microprocessor means, to allow the lock to be opened, said preselected condition being that the lock ID signal is indicated in said data storage as a lock authorized to be opened, and the blocking means and release means being contained entirely within the lock cylinder and occupying substantially no additional space within the area to be secured.

* * * * *

UNITED STATES PATENT AND TRADEMARK OFFICE

CERTIFICATE OF CORRECTION

PATENT NO. : 5,552,777

DATED : September 3, 1996

INVENTOR(S) : Asil T. Gokcebay and Yucel K. Keskin

It is certified that error appears in the above—identified patent and that said Letters Patent is hereby corrected as shown below:

Col. 11, line 15, after "electromagnetic" insert --release means--.

Col. 12, line 57, delete "is".

Signed and Sealed this

Eighteenth Day of March, 1997

Attest:

BRUCE LEHMAN

*Attesting Officer* — *Commissioner of Patents and Trademarks*